April 3, 1962 A. G. PARKER 3,027,714
COMBINED THRUST REVERSING AND NOISE SUPPRESSING
DEVICE FOR TURBO-JET ENGINES
Filed June 11, 1959 6 Sheets-Sheet 1
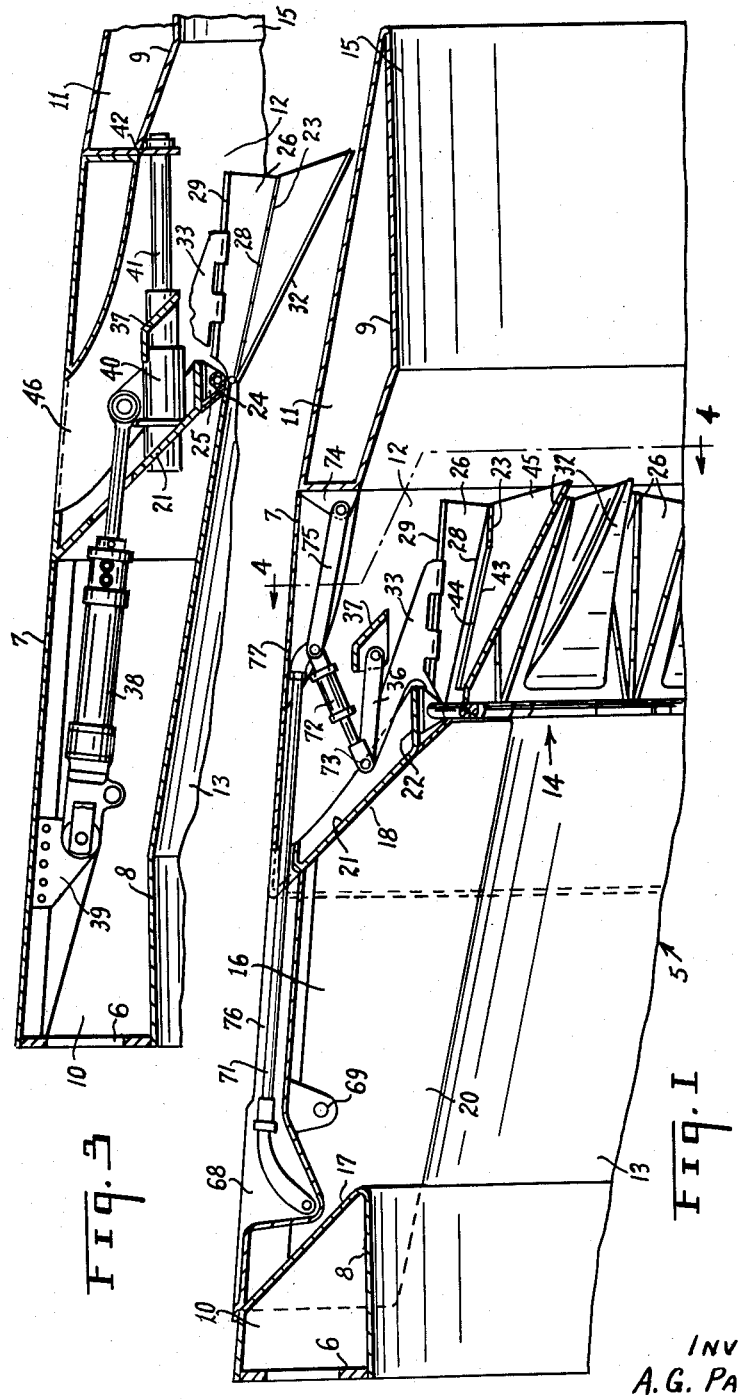
INVENTOR
A. G. PARKER
By Hetherstonhaugh & Co.
ATTORNEYS

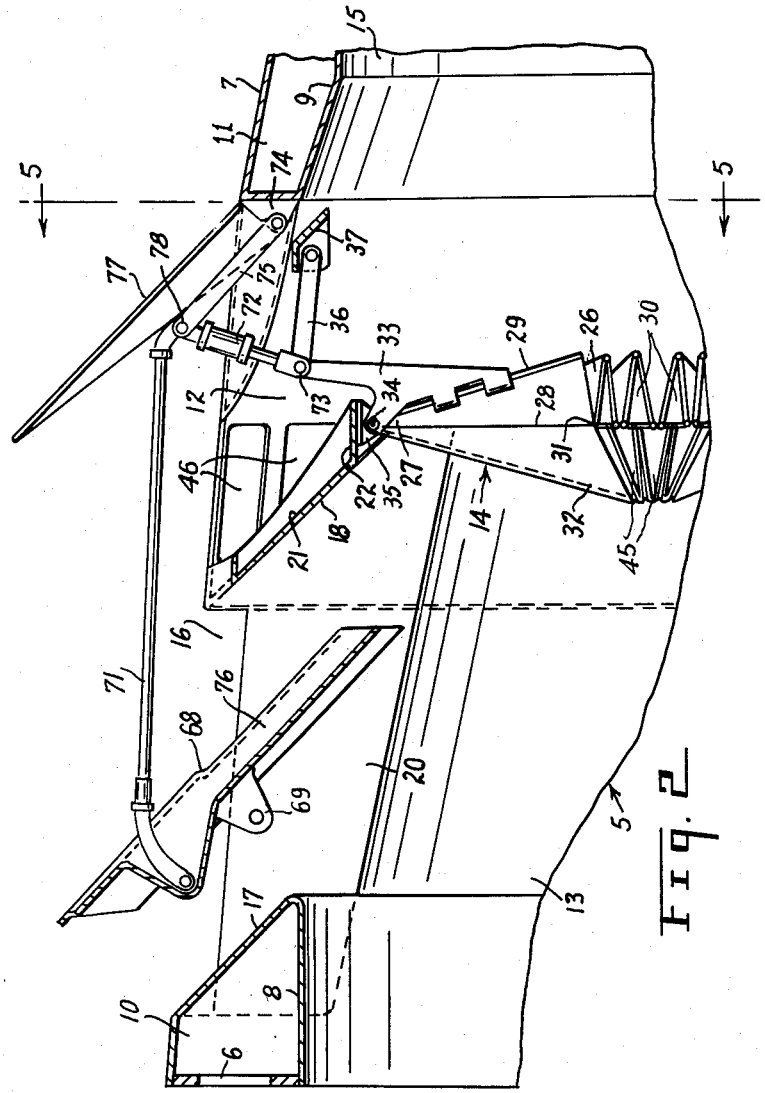

INVENTOR
A. G. PARKER

INVENTOR
A.G. PARKER

ATTORNEYS

April 3, 1962   A. G. PARKER   3,027,714
COMBINED THRUST REVERSING AND NOISE SUPPRESSING
DEVICE FOR TURBO-JET ENGINES
Filed June 11, 1959   6 Sheets-Sheet 5
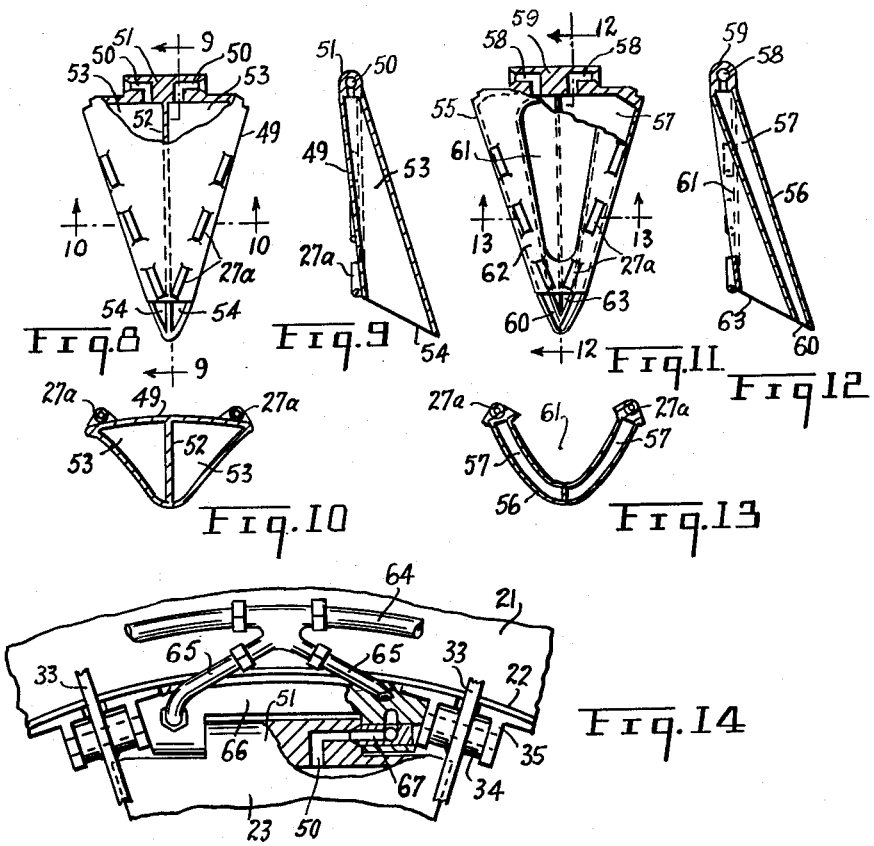
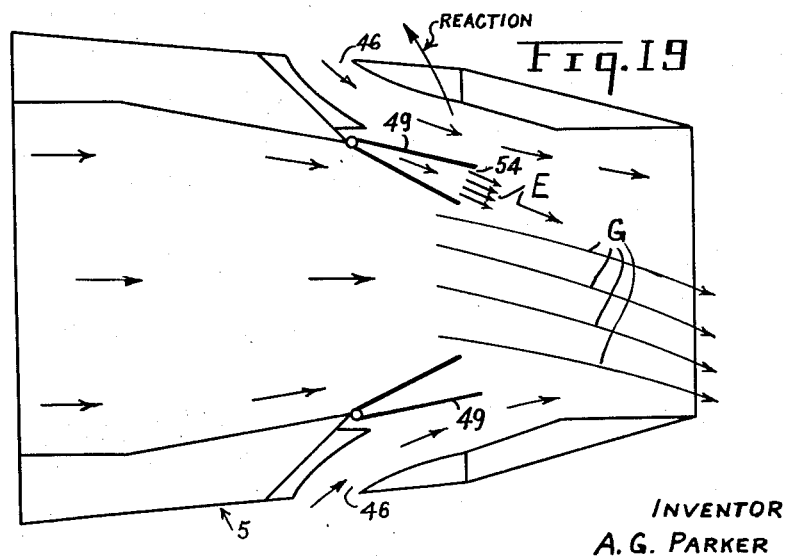
INVENTOR
A. G. PARKER
By Fetherstonhaugh & Co.
ATTORNEYS April 3, 1962  A. G. PARKER  3,027,714
COMBINED THRUST REVERSING AND NOISE SUPPRESSING
DEVICE FOR TURBO-JET ENGINES
Filed June 11, 1959  6 Sheets-Sheet 6

INVENTOR
A. G. PARKER

By Fetherstonhaugh & Co.
ATTORNEYS

United States Patent Office 3,027,714
Patented Apr. 3, 1962

3,027,714
COMBINED THRUST REVERSING AND NOISE SUPPRESSING DEVICE FOR TURBO-JET ENGINES
Arnold George Parker, Montreal, Quebec, Canada, assignor to Canadair Limited, Montreal, Quebec, Canada
Filed June 11, 1959, Ser. No. 819,731
15 Claims. (Cl. 60—35.54)

This invention relates to jet engines and more particularly is concerned with the control of forward and reverse thrust and the suppression of noise in the engine, whereby full power of the engine is utilized to increase efficiency, performance, safety and the reduction of noise level of jet engines in all stages of operation of the engine.

The invention consists essentially in the provision of positive means whereby improved performance in jet engines is obtained by means of a variable area orifice nozzle in which the segmental elements of the nozzle give a tapered expanding V toothed shaped configuration to the nozzle aperture in all its settings and which will function over a wide range of openings and promote broader operational range and effect more efficient operation under changing conditions from full forward thrust position to full reverse thrust position and which will, through the action of the deviated exhaust gases and aerodynamic brake flaps operating in conjunction with the variable area orifice nozzle, effect a braking action on the forward movement of the plane while retaining full r.p.m. of the engine for instant return to full forward thrust if required for emergency operation of the aircraft without the possibility of combustion blow out, and which, combined with the introduction of air into the jet stream through the segmental elements of the variable area orifice nozzle in certain settings of the nozzle effect a marked reduction in the noise level of the engine.

The present invention is an improvement on my U.S. Patent No. 2,886,946 dated May 19, 1959 and covers improvements in the design of the variable area orifice nozzle whereby the segmental flaps forming the nozzle give a pronounced tapered expanding V toothed shaped configuration to the nozzle aperture in all its settings, and the manner in which air is introduced through the segmental elements of the nozzle into the jet stream in order to greatly reduce the noise level of the engine.

The present invention also concerns improvements in the design of the brake flaps and their setting control relative to the setting of the variable area orifice nozzle in order to provide, in some applications, a greater control of yawing movements of the aircraft, the brake flaps being aerodynamically overbalanced so that, in the event of actuation failure, the static pressure in the reverse duct applied to the brake flaps will force the flaps closed sealing the reverse nozzles. This satisfies a mandatory requirement that the device must instantly revert back to full forward thrust when using thrust reversal or modulation.

The device which is the subject of the present invention is self-contained within the profile of the exit nozzle of the engine tail pipe during normal flight and is therefore not subject to losses, such as leakage of gases to the atmosphere in an uncontrolled manner as is the case where variable nozzles or reverse thrust devices are mounted as an appendage of the tail pipe or are moved axially out of the tail pipe; it maintains a substantially concentric opening throughout the full operational range of adjustment thereby maintaining a high internal efficiency equal to that of a fixed nozzle of equal size; it contributes to a greater or less extent by its setting, as a deflector of the gases of combustion to produce a highly efficient reverse thrust without in any way producing a significant back pressure in the engine with consequent loss of r.p.m. so essential to maximum operating efficiency of jet aircraft specially during emergencies; and by means of the design and configuration of the segments of the thrust reversing nozzle in all setting of the nozzle whereby the segments of the nozzle incorporates fingers on the forward surface of the segments giving to the peripheral edge of the orifice of the nozzle a deeper V-shaped configuration which has the effect of greatly increasing the peripheral length of the nozzle for a given nozzle area, thereby reducing the scale of turbulence of the exhaust gases and providing a high degree of noise suppression in full forward and partial deflections of jet. At the same time the fingers of the tapered segments provide passages for the injection of atmospheric air or compressed air into the core of the gases of combustion at an angle to the axis of the core of the gases to add further to the V notched configuration of the surface of the core of gases already imparted by the V notched configuration of the nozzle in any of its settings.

The hollow segments forming the variable area orifice nozzle and carrying compressed air, can be efficiently used to obtain jet exit control and to obtain jet deflection by pneumatic means in the forward thrust position. The whole of the jet efflux can be deflected to one side resulting in an asymmetrical condition in respect to the axis of the aircraft or normal thrust line of propulsion of the gases of combustion. Directional or yaw or lift or pitch controlling moments can be obtained by the introduction and injection of compressed air into the primary jet stream either to the right or left side or the upper or lower side of the variable area orifice nozzle to obtain jet reaction asymmetrical in the direction needed upon demand.

The primary object of the present invention is to provide a combined thrust reversing and noise suppressing device for turbojet engines.

A further object of the invention is to provide means whereby air is entrained into the jet stream of a turbojet engine in a V notch configuration in any setting of the thrust reversing device.

A further object of the invention is to provide a variable area orifice jet nozzle for the control of forward and reverse thrust and in which the control can be exercised without the necessity of reduction in engine r.p.m. and consequently of the volume of gases expelled.

A further object of the invention is to provide means whereby the whole of the jet efflux can be deflected to one side resulting in an asymmetrical condition in respect to the axis of the aircraft or normal thrust line of propulsion of the gases of combustion.

A further object of the invention is to provide a variable area orifice jet nozzle synchronously connected with brake flaps against which the gases of combustion deflected forwardly by the nozzle impinge to increase the value of reverse thrust.

A further object of the invention is to provide brake flaps operatively connected with the variable area orifice jet nozzle and which can be operated asymmetrically and independently of each other for the control of yawing of the aircraft.

A further object of the invention is to provide brake flaps which are aerodynamically overbalanced in order to close automatically upon the failure of actuating means which controls both jet nozzle and brake flaps.

These and other objects of the invention will be apparent from the following specification and the accompanying drawings, in which:

FIGURE 1 is a partial sectional plan view taken on the line 1—1 of FIGURE 4 showing a portion of the tail pipe of a turbojet engine with the thrust reversing nozzle in the fully open forward thrust position and the brake flap closed.

FIGURE 2 is a partial sectional plan view similar to FIGURE 1 but showing the thrust reversing nozzle in a position at right angles to the axis of the engine and showing the brake flaps in the open position.

FIGURE 3 is a partial sectional view similar to FIGURE 1 but taken on the line 3—3 of FIGURE 5 and showing the thrust reversing nozzle unison ring operating mechanism.

FIGURE 8 is a plan view partly in section of one form of segment of the thrust reversing nozzle.

FIGURE 9 is a longitudinal section on the line 9—9 of FIGURE 8.

FIGURE 10 is a cross section on the line 10—10 of FIGURE 8 to an enlarged scale.

FIGURE 11 is a plan view partly in section similar to FIGURE 8 but showing an alternative form of nozzle segment.

FIGURE 12 is a longitudinal section on the line 12—12 of FIGURE 11.

FIGURE 13 is a cross section on the line 13—13 of FIGURE 11 to an enlarged scale.

FIGURE 14 is an enlarged longitudinal cross section of the pivot mounting of either of the segments shown in FIGURES 8 and 11.

FIGURE 19 is a longitudinal vertical section of the tail pipe showing diagrammatically the asymmetrical deflection of the gases of combustion by compressed air injected into the jet stream from one side of the hollow segmental nozzle.

Figure 4:
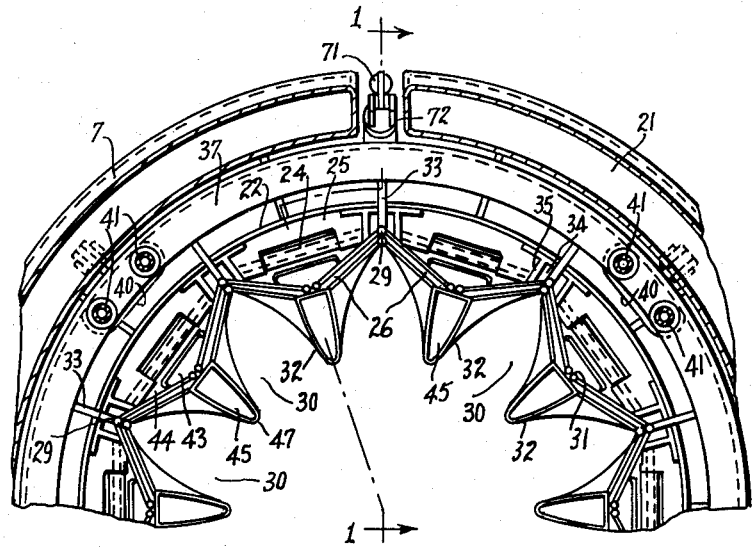
FIGURE 4 is a partial cross section of the tail pipe of the engine taken on the line 4—4 of FIGURE 1 showing the reverse thrust nozzle in the open or full forward thrust position.

Referring to the drawings, only the tail end of the turbojet engine is shown as the combined thrust reversing and noise suppressing device which is the subject of this application can be applied to various types of jet engines. The tail pipe 5 of the engine is joined to the engine casing, not shown, by means of the flange ring 6. The tail pipe 5 has an outer shell 7 and inner shells 8 and 9 defining a forward annular chamber 10 and rear annular chamber 11 separated by the reverse thrust nozzle compartment 12. The inner shell 8 forms a venturi-like tube 13 where the velocity of the gases of combustion are increased to a very high value before passing through the variable area orifice nozzle 14 and the ejector nozzle 15. The reverse ducts 16 are usually two in number, one on each side of the tail pipe 5 and pass through the forward annular chamber 10 and are defined by the forward and rearward sloping walls 17 and 18 and top and bottom walls 19 and 20.

An annular support ring 21 is mounted on the inner surface of the shell 7 and projects inwardly and rearwardly from shell 7 into the compartment 12 at an angle of approximately 45° to the axis of the engine and in line with the rear edge of the tube 13 and has an inner annular flange 22 to provide a rigid anchorage for the variable area orifice nozzle 14 and its operating mechanism.

Figure 5:
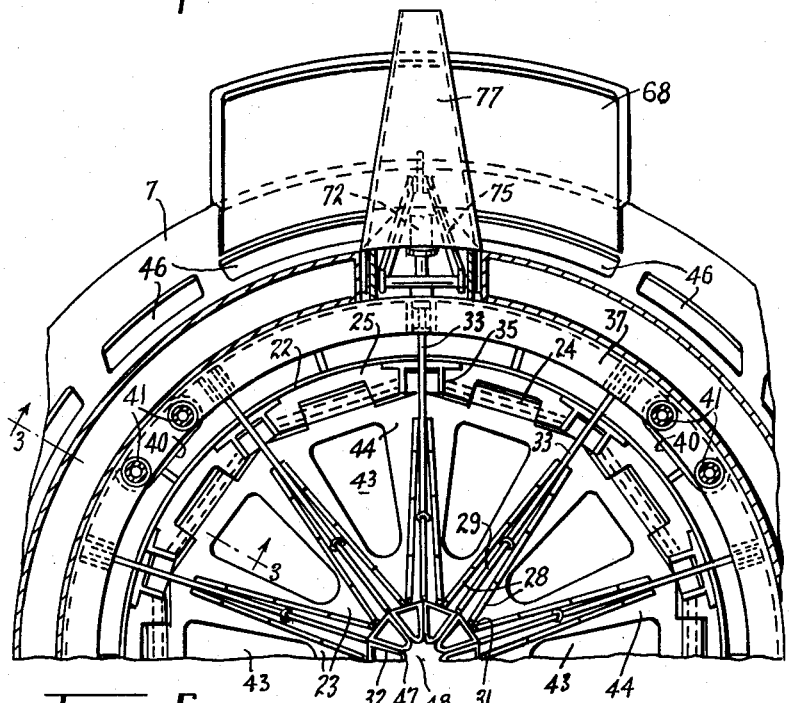
FIGURE 5 is a partial cross section of the tail pipe of the engine taken on the line 5—5 of FIGURE 2 showing the reverse thrust nozzle in the closed position.

The variable area orifice nozzle 14 is composed of a series of tapered segments 23 pivotally hinged at 24 to the pivot brackets 25 which in turn are supported on the annular flange 22 of the inwardly coned annular support ring 21. There can be any convenient number of these segments 23 and they are so formed that when they are pivoted into a position at right angles to the axis of the engine tail pipe their edges are parallel with each other with a very small gap between. The segments 23 are joined together along their radial length by means of intersegmental flaps consisting of a pair of triangular plates 26 the apices 27 of which are located at the wider ends of the segments 23. Each of the pair of triangular plates 26 are hinged at 28 to the segments 23 and are hinged together along their common edges at 29 to form a V notch configuration 30, shown particularly in FIGURES 2 and 4. This V notch configuration 30 is open and facing inwards towards the axis of the tail pipe when the variable area orifice nozzle is expanded in the maximum forward thrust position as shown in FIGURE 4 and its triangular sections narrow down until the plates 26 come close together when the nozzle is substantially closed into the minimum forward thrust position and the reverse thrust position as shown in FIGURE 5.

In order that the variable area orifice nozzle 14 will give the best results in reverse thrust setting it is necessary that the segments 23 pass through the 90° position or at right angles to the axis of the tail pipe, into a position of about 120° from the full open position or approximately 25° forward of the 90° position. In order that this can be accomplished without having gaps between the segments 23 in the closed position of the nozzle 14, the pair of hinges 28 on each of the segments 23 taper inwardly towards each other in the direction of the axis of the tail pipe to a point 31 as shown in FIGURES 2, 4 and 5.

Each of the segments 23 are of hollow construction and are formed with a tapered finger 32 on their inward side, that is the side of the segments facing the axis of the tail pipe when the nozzle 14 is in the open or full forward thrust position as shown in FIGURE 1 and forming the forward side of the nozzle 14 when the nozzle is in the full reverse thrust position as shown in FIGURE 2, the fingers 32 tapering from zero at the base of the segments 23 to a maximum depth at the apex of the segments. The hollow tapered finger construction of the segments 23 has a two-fold purpose. (a) To provide a tapered expanding V toothed configuration to the orifice of the nozzle 14 in all settings, with the fingers penetrating deep into the core of the jet stream in order to effect a large measure of noise suppression. (b) To provide passages carrying atmospheric or compressed air directly into the V notched core of the jet stream to further augment the noise suppression effect of V toothed construction of the nozzle 14 and to effect a degree of jet deflection as will be explained later.

The segments 23 are rotated about their pivots 24 by means of the arms 33 which are pivoted at 34 in the brackets 35 mounted on the flange 22 of the annular support member 21. The links 36 connect the arms 33 with the unison ring 37. The number of these arms 33 and links 36 will correspond to any desired number of segments 23 forming the variable area orifice nozzle 14.

The unison ring 37 is reciprocated fore and aft by any suitable mechanism, electric, mechanical or hydraulic, and is here shown as being operated by hydraulic jacks 38 pivotally anchored to the brackets 39 on the shell 7 of the tail pipe 5, at one end and at the other end are pivotally connected to the sliding sleeves 40. The unison ring 37 is reciprocatingly supported, by means of the pairs of sleeves 40 sliding on the pairs of guide rods 41 located at spaced intervals around the unison ring 37. These guide rods 41 are supported between the annular supporting ring 21 and the annular structural member 42. The unison ring 37 is constrained to be reciprocated on the guide rods 41 in an even manner without twisting, resulting in a uniform synchronous and simultaneous travel of the nozzle assembly 14 through its complete angular range of operation from full forward thrust position to full reverse thrust position.

In FIGURES 1 to 4 the segments 23 with their hollow tapered fingers 32 are shown as having a large tapered air inlet opening 43 on the top or rearward surface 44 and air discharge nozzle opening 45. Some of the atmospheric or ambient air drawn into the reverse thrust nozzle compartment 12 through the openings 46 in the shell 7 is entrained through the openings 43 in the segments 23 and is discharged at high velocity through the nozzle openings 45 directly into the core of the jet stream in all settings of the nozzle 14. The discharge nozzle openings 45 are so shaped that when the reverse thrust nozzle 14 is passing through the 90° position, shown in FIGURE 5, the sides of the nozzles 45 practically touch each other without any interference between them and the inner tips 47 will together form a minimum aperture 48 about the axis of the tail pipe. This aperture 48 can be increased in area depending on design considerations.

In FIGURES 8 to 13 various alternative forms of hollow segments are shown. These alternative forms permit compressed air to be fed through the segments and discharged into the core of the jet stream.

In FIGURES 8, 9 and 10 the segment 49 is similar in shape in plan view to the segment 23 and is provided with pressure air inlets 50 at its hinge member 51. The segment 49 is divided longitudinally by the web 52 to provide two separate compartments 53 terminating in the discharge nozzles 54. The hinge blocks 27a forming a part of the hinge 28 are shown as integral members of the segment.

In FIGURES 11, 12 and 13 the segment 55 combines features of the segment shown in FIGURES 1 to 5 and FIGURES 8 to 10. The double wall of the finger portion 56 of the segment 55 forms a V shaped passageway 57 through which compressed air entering the segments through the air inlets 58 in the hinge member 59 is passed through the passages 57 and discharged into the core of the jet stream through the discharge nozzle 60. Atmospheric air drawn into the reverse thrust nozzle compartment 12 through the openings 46 on the shell 7 is entrained through the large area opening 61 in the top or rear surface 62 of the segment and is discharged into the core of the jet stream through the discharge nozzle 63. By enveloping the entrained atmospheric air with a layer of compressed air, the individual nozzle assembly acts as an ejector giving further pumping action to the entrained air and the temperature of the air is kept to a relatively low value both in its passage through the segments and its entry into the core of the jet stream thereby positively cooling the jet stream and segments and at the same time further indenting the boundary of the jet stream.

In FIGURE 14 a typical method of feeding compressed air to the segments is disclosed. Compressed air is fed to the manifold 64 from any convenient source and is delivered through the branch connections 65 to the fixed hinge blocks 66 and thence through the internal passages 67 to the passages 50 and thence into the compartments 53 of the segments 49 in the form of the segments shown in detail in FIGURES 8 to 10 and to the passages 58 in FIGURES 11 to 13. Other methods of delivering compressed air through hinge blocks 66 can be used.

Figure 22:
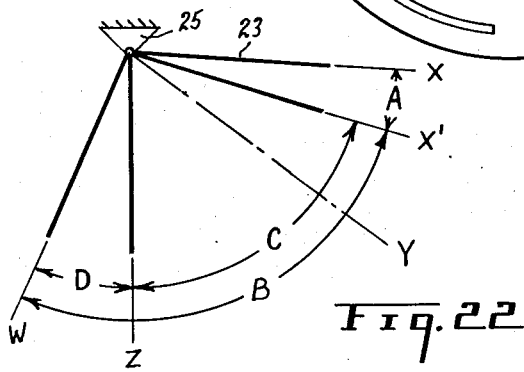
FIGURE 22 is a diagram showing the operational ranges of the variable area orifice nozzle.

Directly connected with and operating in unison with the variable area orifice nozzle 14 are the brake flaps 68 which are pivoted at 69 to the top and bottom walls 19 and 20 of the reverse duct 16. These brake flaps 68 are overbalanced in order that, should failure of the actuating mechanism occur, the flaps will automatically take up a closed position as shown in FIGURE 1, the closing of the brake flaps being assisted by the flow of the gases of combustion and pressure on the overbalanced portion of the flap. The brake flaps 68 are operatively connected with the variable area orifice nozzle 14 and the unison ring 37 by means of the operating rod 71 and the hydraulic jack 72, the latter being pivotally connected at 73 to the end of the arms 33 and links 36. The common pivot 78 of the rod 71 with the hydraulic jack 72 is connected to the bracket 74 by means of the link 75. The auxiliary actuating jacks 72 act as variable length members and are introduced as a linkage between the variable area nozzle 14 and brake flaps 68 for three reasons:

*First.*—In the operation of the variable area nozzle 14 they are synchronously unlocked or released by hydraulic pressure on demand, to allow the variable area nozzle to travel through Range "A" shown in FIGURE 22 with the flaps 68 remaining in the closed and sealed position and blocking the reverse ports 16, the hydraulic reaction on the jacks forcing the flaps 68 closed, assisted by the static pressure in ports 16 acting on the overbalanced portion at the flap.

*Second.*—Hydraulic jacks 72 can be synchronously connected and locked in position on demand between the nozzle 14 and flaps 68 to give symmetrical angular travel to the reverse flaps 68 for controlling modulated forward and reverse thrust through range "B" as shown in FIGURES 15, 16, 17 and 22, both right and left hand flaps 68 controlling equal reverse nozzle areas and mass flow.

Figure 18:
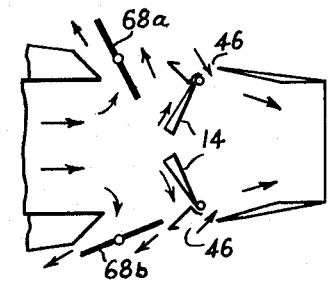
FIGURE 18 is a sectional diagram similar to FIGURE 17 with asymmetrical brake flap settings for positive yaw control. The opposite asymmetrical setting of flaps, would result in a negative yaw control.

*Third.*—Jacks 72 can be operated independently in their linear stroke controlled by hydraulic selector valves from the rudder aircraft control system, not shown, to give asymmetrical operation to flaps 68 as shown in FIGURE 18, during the modulated or maximum reverse thrust cycle. Controlling of the yawing moment can be obtained by either positive or negative reactions due to changes in area and mass flow through the reverse nozzles 16 asymmetrically.

This third condition would be only used in some aircraft configurations requiring yaw control, using reverse flow reactions as controlling means.

The control between variable nozzle 14 and flaps 68 to accomplish the desired functions of the device, can be exercised by various actuating means electrical, pneumatic or hydraulic and is shown here as operating hydraulically. The brake flaps 68 are usually two in number and are generally located on the sides of the tail pipe 5 in single engined aircraft. In multiple engined aircraft the brake flaps may be located in any other position around the periphery of the tail pipe in which the diverted gases of combustion will not interfere with esential fairings of the aircraft.

In single engined aircraft, yaw of the aircraft can be controlled by means of the hydraulic jacks 72 operating the brake flaps 68 independently. This is illustrated diagrammatically in FIGURE 18 in which the brake flap 68a is shown in a fully opened position for maximum braking effect on the right hand side of the aircraft while the brake flap 68b is shown in the nearly closed position for minimum braking effect on the left hand side of the aircraft. Where no yaw control is required the hydraulic jacks 72 would be operated symmetrically. The brake flaps 68 are provided with a longitudinal recess 76 into which the operating rod 71 seats when the brake flaps are in the closed position in order to reduce to a minimum the resistance offered by the operating mechanism when the aircraft is operating under full forward thrust. The operating mechanism is further protected by the hinged flap 77 pivotally mounted on the bracket 74 and pivotally connected with the operating mechanism at the pivot 78.

Under certain circumstances such as for directional control and for jet lift, deflection of the jet of gases of combustion is desirable. The elements provided and embodied in the construction of this device by the use of the hollow segments 23 forming the nozzle 14 and carrying compressed air, can be efficiently used to obtain jet exit control and to obtain jet deflection by pneumatic means in the forward thrust position of the nozzle 14.

Figure 20:
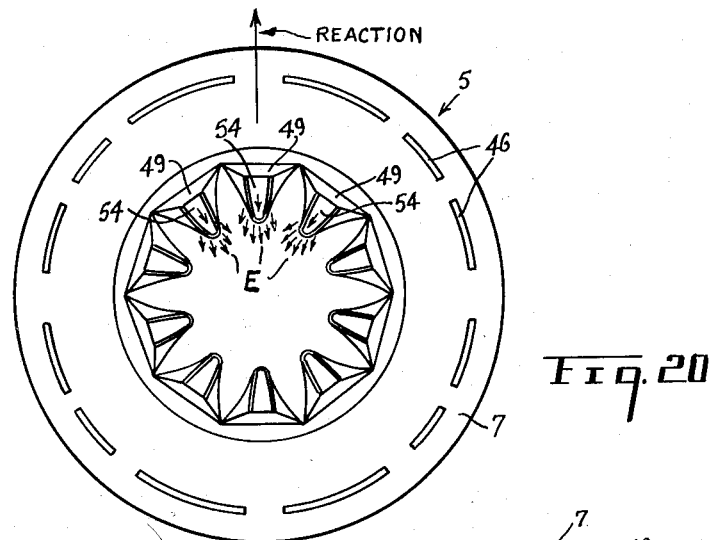
FIGURE 20 is an end view of the tail pipe showing by arrows the injection of compressed air into the jet stream from the top sector of segments.
Figure 21:
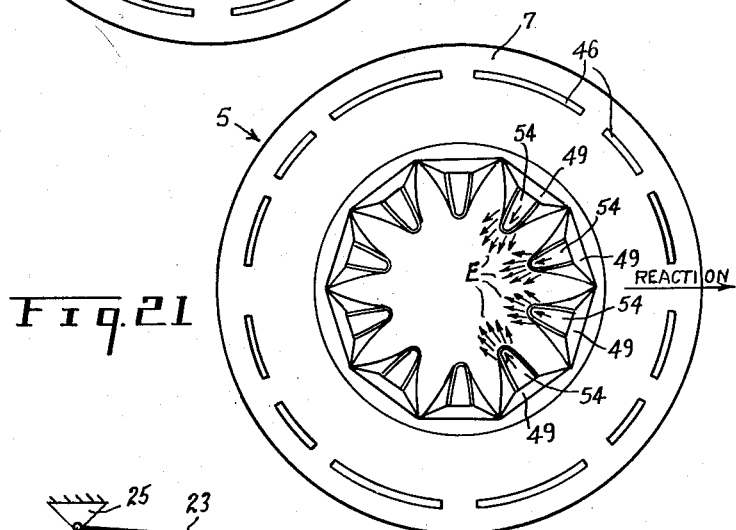
FIGURE 21 is a view similar to FIGURE 20 but showing compressed air being injected into the jet stream from the right hand sector of segments.

Referring particularly to FIGURES 19, 20 and 21, the segments types 49 of the nozzle 14 are shown in the open nozzle or forward thrust position with the compressed air exit nozzle 54 facing rearwardly and inwardly towards the axis of the jet of gases of combustion. By means of control valves, not shown, and under the control of the pilot of the aircraft, the supply of compressed air to individual segments 49 or to groups of segments can be cut off while the supply of compressed air is maintained in other segments or group of segments. In FIGURES 19 and 20 the supply of compressed air is cut off to the lower group of segments 49 and maintained in the upper group. The effect of this is shown diagrammatically in FIGURE 19 where the arrows E represent the flow of compressed air ejected from the nozzle 54 of the segment 49 and impinging deep into the core of the jet of gases of combustion represented by the arrows G. As there is no corresponding ejection of compressed air from the lower segments 49, there is effected a deflection of the gases of combustion G in the manner shown, resulting in an asymmetrical condition in respect to the axis of the aircraft or normal thrust line of propulsion of the gases of combustion.

In FIGURE 21 the flow of compressed air is shown as being maintained in a group of segments 49 on the right hand side of the aircraft which will result in a deflection of the gases of combustion to the left. It is to be understood that any well known form of valve control means could be utilized to selectively control the flow of compressed air to any individual segment, group of segments or combination of groups of segments to give the desired deflection of the gases of combustion and also to control the degree of deflection.

OPERATION

In the operation of this invention, the gases of combustion enter the tail pipe 5 and their velocity is increased in the venturi-like tube 13. Under conditions of full forward thrust the variable area orifice nozzle 14 is maintained in the full open position shown in FIGURE 1 and the gases pass through the orifice and through the ejector nozzle 15. The gases of combustion while in the tube 13 have a circular configuration. This circular configuration of the gases is changed as they pass through the nozzle 14 where the surface is indented by the V notch configuration of the segments 23 and the intersegmental flaps 26 and are still further indented by the tapered fingers 32. These fingers 32 taper from zero at the base or hinged portions of the segments 23 to a maximum depth at the apex of the segments, so that, as seen in FIGURE 1 the V configuration given to the surfaces of the gases by the fingers will become deeper as the gases pass through the nozzle 14. By reason of the ejector principle, the high velocity of the gases of combustion creates an area of negative pressure around and in the gas stream causing entrainment of a stream of cold air to be indrawn from the atmosphere through the ejector intake openings 46 into the thrust nozzle compartment 12. Some of this atmospheric air is drawn around the configuration of the nozzle 14 into the mass flow of the main jet stream and prevents back flow of gases through the openings 46 when the engine is normally in position of forward thrust operation. A portion of the air drawn in through the openings 46 is entrained through the openings 43 in the segments 23 and is passed through the fingers 32 and ejected through the nozzles 45 at an angle into the core of the gases of combustion to further indent the boundary of the gases and resulting in the simulation of additional corrugations beyond that made by the fingers 32. In FIGURES 8 to 13 means are shown by which compressed air is passed through the segments of the nozzle 14 in order to further augment the effect of the atmospheric air entrained into the core of the gases of combustion. The tapered design of the fingers 32 present minimal restrictions to the free mixing of the external air, either atmospheric or compressed, with the gases of combustion in order to yield maximum noise reduction.

The V configuration given to the surface of the jet of gases by the nozzle 14 in its open or full forward thrust position is maintained as the nozzle is moved from the full forward thrust position through 90° into a position at right angles to the axis of the jet of gases, as shown in FIGURE 5 and thence into a position of approximately 25° beyond to the full reverse thrust position. Even approaching the 90° position of minimum orifice, V notching of the surface of the gas jet is maintained due to the angle of discharge of either atmospheric or compressed air from the segments into the jet stream.

The variable area orifice nozzle 14 can be operated through various stages to obtain certain degrees of control in the operation of the aircraft and its engine. Reference is made to FIGURE 22 in which the various stages of control hereinafter described are illustrated:

*Range "A".*—Is the normal limits of movement of the variable area nozzle 14 shown at X—X' in FIGURE 22 which permits the use of the maximum power from the engine for forward thrust operation. The variation of nozzle opening and consequent control of the velocity and mass flow of the main jet in this range are valuable during landing approach and flareout where thrust deviation is not required while maintaining full engine r.p.m. and to achieve an improvement in specific fuel consumption at cruising thrust conditions.

It is known that the thrust can be increased or decreased by increasing or decreasing the effective area of the exhaust nozzle and that only relatively small changes in such areas are sufficient to produce considerable variations in thrust.

The nozzle is that part of the jet engine which converts the available pressure energy in the tail pipe to velocity energy, thereby achieving a momentum change that results in propulsive force. The nozzle area can be chosen to give the best compromise in operating efficiency over a wide range of flight conditions.

The nozzle area can be set to give optimum efficiency for each condition and thereby make the turbine engine more economical to operate under the more flexible conditions that it actually encounters in service.

Thrust value can be reduced in this range A while retaining maximum engine r.p.m. and temperatures. Within this range brake flaps 68 and hinged flap 77 FIGURE 1 are closed and offer no interference with the slip stream of the aircraft.

Figure 6:
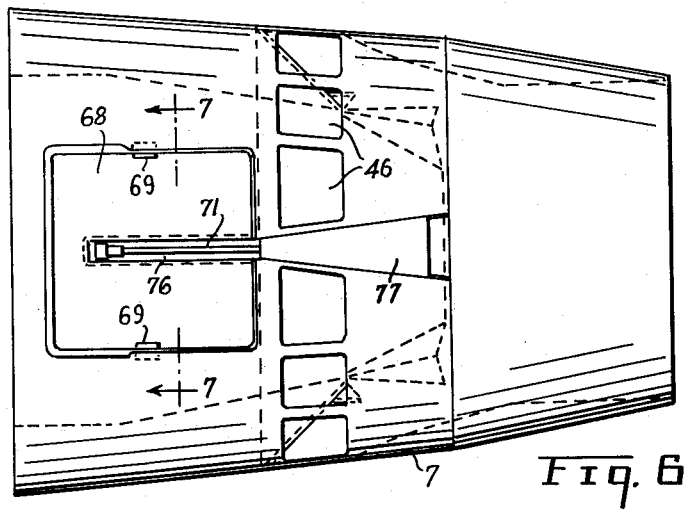
FIGURE 6 is a side view of the tail pipe of the engine to a reduced scale showing the brake flap closed and also showing the entrained atmospheric air openings.
Figure 7:
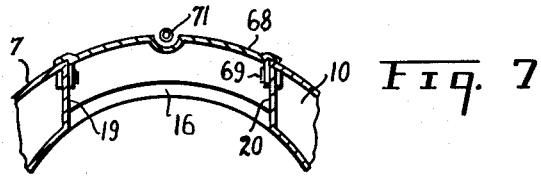
FIGURE 7 is a cross section on the line 7—7 of FIGURE 6.
Figure 15:
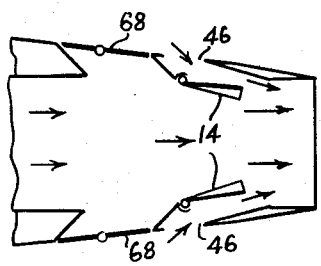
FIGURE 15 is a sectional diagram, in plan view, of the tail pipe of the engine showing the thrust reversing nozzle in the full open position and the brake flaps closed for maximum forward thrust with entrained air entering the tail pipe rearwardly of the thrust reversing nozzle.
Figure 16:
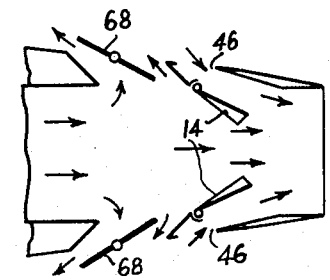
FIGURE 16 is a sectional diagram similar to FIGURE 15 but showing the thrust reversing nozzle partly closed and the brake flaps partly open to provide symmetrical modulated thrust in flight and approach control at full or partial power and r.p.m.
Figure 17:
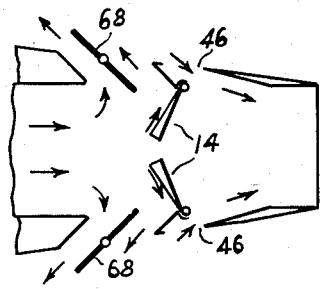
FIGURE 17 is a sectional diagram similar to FIGURE 15 but showing the thrust reversing nozzle in full reverse thrust position and the brake flaps in symmetrical full braking position.

Within this range atmospheric air is entrained through openings 46 (FIGURE 6) in the shell 7 and is induced into the openings or passageways 43 (FIGURES 4 and 5) of the nozzle segments 23 and through tapered fingers 32 shown in FIGURE 1. Fingers 32 are of hollow construction allowing compressed air to envelop the entrained atmospheric air through the individual finger nozzles 45 in FIGURE 4 or in the form of fingers shown in FIGURES 11 to 13 and further results in cooling of same. This combined air is discharged into the core of the jet stream to obtain a high degree of noise suppression. The injection of compressed air plus entrained atmospheric air into the core of the jet results in an effective increase in the depth of the segments and will provide a useful increase in turbulence applicable to the jet choked condition.

A reduction in jet noise lies in the change of orifice shape, the increase of peripheral length for a given cross sectioned area of nozzle results in a mechanism for changing of noise frequency.

The blowing of compressed air into the jet through the deep fingers 32 can be used to effectively increase the ratio of peripheral length to cross sectional area of the nozzle. This has been found to work for both subsonic and choked jets. For choked jets the main effect comes from a breaking up of the regular shock pattern and to this end the blowing of compressed air into the jet to increase the initial turbulence will result for this condition in a higher degree of noise suppression than for the subsonic case. The V formed corrugated nozzle embodied in this device plus compressed air injection as outlined above should result in a high-degree of noise attenuation for both subsonic and supersonic jets.

By valving and selector means in the pneumatic system the compressed air supply can be effectively controlled on demand in response to signals from the engine control unit to direct the compressed air supply through the respective fingers of the nozzle segments to the right or left for directional control into the jet stream in a rearward and inward direction towards the axis of the jet to effectively obtain jet deflection of the gases of combustion, the opposite supply of air being cut off in each case. The deflected gas stream now results in a reactive force asymmetrical to the normal thrust setting, this force being transferred to the aircraft structure, resulting in control of the aircraft either directionally or for lift, for in flight or for landing procedure.

During range "A" from maximum nozzle area through the varying area cycle, at maximum engine power and r.p.m. on forward thrust, very effective noise attenuation will be obtained. Entrained atmospheric air by ejector and compressed air through nozzles of fingers 32 into the main jet will augment thrust and offset any losses due to the corrugated form of nozzle. In this range the auxiliary jacks 72 are unlocked hydraulically, allowing the nozzle to vary area upon demand, the reactive forces on the jacks keep the flaps 68 closed, assisted by the static pressure in reverse ducts on the aerodynamically balanced flaps.

*Range "B"*.—Takes in the full remaining range of operation of the variable area nozzle 14. In any setting within this range, a partial or full percentage of power is available for thrust deviation depending on the setting of the nozzle. It is within this range that the aerodynamic flaps 68 will operate in conjunction with the nozzle 14 to reduce the speed of the aircraft either in flight or upon landing approach or landing without reduction in engine r.p.m. thereby enabling the engine to remain at constant power setting ready for instant change back to forward thrust operation. Depending on the setting of the nozzle 14 and the flaps 68 a percentage of the mass flow of the main jet stream will impinge of the forward facing side of the nozzle 14 deflecting that portion of mass flow forward through the openings 16. It must be noted that the reaction of both the slip stream and the ejected gases exert a rearwardly directed pressure component on the forward or underbalanced portion of the flaps 68.

Deceleration due to reverse thrust is a result of reactive component of forces of the variable area nozzle 14 and the brake flaps 68, these forces being transferred to the aircraft structure via the annular supporting ring 21. During this range, entrained atmospheric and compressed air as described in Range A will operate and to a greater or lesser extent will result in noise suppression depending on the nozzle setting and percentage of blocking of the main jet. In a setting as shown at position "Y" where approximately 50% of the mass flow is both forward and rearward a thrust balance exists, the entrained and compressed air is injected in the jet at great depth through the deep corrugation formed by the segments 23 and intersegments 26 and the penetration of the fingers 32 into the core of the jet, this will result in noise attenuation during the modulated cycle. In this range the auxiliary jacks 72 are operated and locked in position on demand to give equal travel for modulation or full reversal of the variable area nozzle 14 in co-ordination with symmetrical flap settings. Only in installations where yaw controlling moments are required are the jacks 72 operated to give unequal travel right and left to result in asymmetrical flap settings.

It is to be noted that the aerodynamically overbalanced flaps in the reverse nozzles split the gases of combustion. A percentage of mass flow being directed along the rear face of flap and act as a shield, the remaining mass flow directed along the forward face. By the so-called "Coanda" effect the forward gas will tend to adhere to the flap in a rearward and outward direction. This will effectively prevent attachment of gases along the forward surface of shell 7 and prevent gases being ingested on the engine intake.

*Range "C"*.—It is within this range of setting of the variable area nozzle 14 that control between forward and reverse thrust will be exercised as required in manoeuvering the aircraft in the air, or for modulating the speed upon the landing approach and landing flareout.

When the variable area nozzle 14 is on the Range A setting the V notching of the nozzle plus entrained and compressed air injected into the main jet stream the reasons as heretofore described will result in noise suppression during the period of operation at which it is most desired.

The spread of the V notch is gradually reduced as the nozzle is closed, to present a smaller opening to the main jet stream until at the point where the nozzle is at right angles to the axis of the jet stream the V notches have been closed up so that the gases being deflected are not cut up by indentations on the deflecting surface. The forward protruding fingers 32 will help deflection and straighten out the turbulence of the reverse gases.

Compressed air plus entrained air injection nozzle openings 45 will cool the segments 23, will also help deflection or deviation of gases in the reverse direction. The amount of orifice desired in the nozzle 14 shown at 48 in FIGURE 5 when it is at right angles to the axis of the main jet will depend upon the operating characteristics of the engine at this time, such as percentage of forward thrust required to eliminate back pressure on the engine under all conditions of operation. FIGURE 5 shows practically 100% blockage of the main jet stream but the degree of orifice desired can be varied in design as desired.

The complete installation is efficiently cooled by cool air passing over all surfaces exposed to the high temperature gases of all moving parts. Entrained secondary flow atmospheric cool air by the ejector nozzle 15 passes over the outer surface of the segments 23 and intersegments 26 forming the V nozzle 14 from full forward thrust through range "C," is further cooled by compressed cool air from the engine compressor or other source of supply passing through the type of hollow segments shown in FIGURES 8 to 13 from full forward thrust through range "B" to the full reverse thrust position W as shown in FIGURE 22.

This entrained secondary flow cool air also envelopes all actuating links 33 and 36, auxiliary jacks 72, unison ring 37, sleeves 40 and guide rods 41 assembled in the ejector compartment or nozzle.

The forward annular compartment housing the actuating jacks 38 and synchronizing means will be cooled by auxiliary cool air from the compressor or other outside source of supply further augmented in flow by the ejector nozzle through suitable vents or openings in support diaphragm 21.

Cool air fed through the complete segmented nozzle 14 will keep down the temperatures of these parts for longer life under all operating conditions and in the worst condition when the nozzle is in maximum Reverse thrust position.

Operating linkage 71 and flaps 68 are cooled in the closed or forward thrust position by slipstream air passing over the outer shell 7 in flight.

In an emergency as in the case of the aircraft overshooting on the landing run or other similar courses, the variable area nozzle 14 in the reverse thrust position and brake flaps 68 in the open position can instantly revert back and be released to the full forward thrust position assisted by the high pressure on the forward face of the variable area nozzle 14 where positive thrust is increased to a maximum for take-off.

As stated previously in case of the complete failure of actuating means controlling the nozzle and brake flaps the high pressure on the forward face of nozzle 14 and by the use of aerodynamically overbalanced flaps the static pressure in the reverse ducts 16 will force the flaps closed sealing the reverse nozzles when using thrust reversal or modulation, the above being a mandatory requirement.

The use of the above described invention, not one but many improvements in the operation of jet aircraft are accomplished. The interaction of the variable area nozzle and the brake flaps together with the accomplished deflection of the main jet stream to obtain thrust reversal and means for obtaining a variable area nozzle in range "A" for optimum operation on forward thrust combined with means for obtaining noise suppression and deflection of the jet of gases of combustion all embodied in one integral unit produce results that have not hitherto been obtainable, such as wider operational range of the aircraft, more efficient operation under changing conditions, such as wider control of rate of descent, speed regulation and fuel consumption, more efficient volumetric control of the gas discharge and consequent control of back pressure on the engine, resulting in a greater measure of speed control without change in the rate of combustion.

This invention can be used equally well with engines of the bypass, front or aft fan air augmentation and with this configuration applied to both by-pass and primary flows engine arrangements, significant noise reduction can be realized. The reversal system also as applied to both by-pass and primary mixed efflux should result in higher reversal efficiency plus a cooler installation.

*Range "D."*—It should be noted that maximum reverse thrust is possible at the setting of the nozzle 14 marked at "Z" with flaps 68 fully open but increased efficiency of deflection is obtained in a forward setting range "D." The variation of setting required in range "D" will depend upon design requirements. During normal operation of the aircraft in flight the variable area nozzle 14 will be kept within the range "A." In order that the variable area nozzle 14 cannot be inadvertently moved to a position in range "C," the controls operating the nozzle from the cockpit will be designed to obtail "fail" safe operation under all normal in flight conditions. Upon demand for in flight deceleration and for approach and landing operations very definite intent steps must be designed into the control system to prevent inadvertent operation in the reverse range "C" of the device.

What I claim is:

1. A combined thrust reversing and noise suppression device for turbo-jet engines comprising a tail pipe nozzle, a variable area orifice nozzle mounted within said tail pipe and concentric therewith, the said variable area orifice nozzle being formed of an annular flexible diaphragm consisting of a multiplicity of segments hinged at the outer periphery of the diaphragm and pairs of segments hinged upon themselves and to the first mentioned segments along the radial edges of said segments to form a V notched configuration on the rearward facing side of said diaphragm, the said first mentioned segments each having a hollow finger portion forming air ducts and together forming a V notched configuration on the forward facing side of said diaphragm, linkage means connected to said pairs of segments to operate said variable area orifice nozzle through approximately 120° from a position substantially concentric and parallel to the axis of the said tail pipe to a position beyond a plane at right angles to the axis of the tail pipe, the said hollow finger portions of the first mentioned segments projecting radially inwards towards the axis of the tail pipe when the said variable area orifice nozzle is moved from a position substantially parallel with the axis of the tail pipe to a position approaching a plane at right angles to the axis of the tail pipe and forming a series of gas deflecting and gas straightening surfaces when the said nozzle is moved from a position at right angles to the axis of the tail pipe to a position at an angle forwardly of a plane at right angles to the axis of the tail pipe.

2. A combined thrust reversing and noise suppression device for turbo-jet engines comprising a tail pipe nozzle of hollow annular construction, the said tail pipe having a series of air inlets in the wall thereof, reverse thrust openings in said tail pipe forward of said air inlet openings, a variable area orifice nozzle mounted within said tail pipe intermediately between said air inlet and reverse thrust openings, the said variable area orifice nozzle being formed of an annular flexible diaphragm consisting of a multiplicity of segments hinged at the outer periphery of the diaphragm and pairs of segments hinged upon themselves and to the first mentioned segments along the radial edges of said segments to form a V notched configuration on the rearward facing side of said diaphragm, the said first mentioned segments each having a hollow finger portion forming air ducts and together forming a V notched configuration on the forward facing side of said diaphragm, linkage means connected to said pairs of segments to operate said variable area orifice nozzle through approximately 120° from a position substantially concentric and parallel to the axis of the said tail pipe to a position beyond a plane at right angles to the axis of the tail pipe, the said hollow finger portions of the first mentioned segments projecting radially inwards towards the axis of the tail pipe when the variable area orifice nozzle is moved from a position substantially parallel with the axis of the tail pipe to a position approaching a plane at right angles to the axis of the tail pipe and forming a series of gas deflecting and gas straightening surfaces when the said nozzle is moved from a position at right angles to the axis of the tail pipe to a position at an angle forwardly of a plane at right angles to the axis of the tail pipe.

3. A combined thrust reversing and noise suppression device as set forth in claim 2, in which the hollow fingers of the first mentioned segments are in the form of air ducts passing entrained air from the said air inlets on the tail pipe inwardly towards the axis of the tail pipe.

4. A combined thrust reversing and noise suppression device as set forth in claim 2, in which the hollow fingers of the first mentioned segments are connected to a source of compressed air and have discharge nozzles directed substantially inwards towards the axis of the tail pipe.

5. A combined thrust reversing and noise suppression device as set forth in claim 3, in which the hollow fingers of the first mentioned segments have hollow walls, the space therebetween being connected to a source of compressed air and having discharge nozzles directed substantially inwards towards the axis of the tail pipe.

6. A combined thrust reversing and noise suppression device as set forth in claim 2, in which the hollow fingers of the first mentioned segments are of tapered section having a wide shallow section at the hinge portion of the segment and having a deep narrow section at the opposite end of the segment.

7. A combined thrust reversing and noise suppression device as set forth in claim 4, in which means selectively control the supply of compressed air to individual fingers of the segments.

8. A combined thrust reversing and noise suppression device as set forth in claim 2, in which an annular conical support ring separates the air inlet openings from the reverse thrust openings, the inner periphery of which forms an annular support ring on which the said variable area orifice nozzle is mounted.

9. A combined thrust reversing and noise suppression device as set forth in claim 2, in which the brake flaps are pivotally mounted at the said reverse thrust openings and are synchronously connected to the linkage means operating said variable area orifice nozzle, the said brake flaps being aerodynamically overbalanced and being closed and sealed by static pressure in the reverse thrust openings on failure of the connection between the brake flaps and the variable area orifice nozzle.

10. A combined thrust reversing and noise suppression device as set forth in claim 9, in which the brake flaps are so mounted that, in their open position, the brake flaps split the gases of combustion flowing in the reverse direction to prevent attachment of the gases to the forward cowling of the engine.

11. A combined thrust reversing and noise suppression device as set forth in claim 9, in which the linkage means include an annular unison ring and means to reciprocate the said annular unison ring to vary uniformly the operative position of the variable area orifice nozzle and said brake flaps.

12. A combined thrust reversing and noise suppression device as set forth in claim 9, in which means are incorporated in the linkage means to asymmetrically vary the setting of the brake flaps indepnedently of the setting of the variable area orifice nozzle.

13. A combined thrust reversing and noise suppression device for turbo-jet engines comprising a tail pipe nozzle of hollow annular construction, the said tail pipe having a series of air inlets in the wall thereof, reverse thrust openings in said tail pipe forward of said air inlet openings, a variable area orifice nozzle mounted within said tail pipe intermediately between said air inlet and reverse thrust openings, the said variable area orifice nozzle being formed of an annular flexible diaphragm consisting of a multiplicity of segments hinged at the outer periphery of the diaphragm and pairs of further segments hinged upon themselves and to the first mentioned segments along the radial edges of said segments to form a V notched configuration on the rearward facing side of said diaphragm, the said first mentioned segments each having a hollow finger portion forming air ducts and together forming a V notched configuration on the forward facing side of said diaphragm, aerodynamically overbalanced brake flaps pivotally mounted at the said reverse thrust openings, a unison ring, guide means supporting said unison ring, linkage means connecting said pairs of segments and said brake flaps with said unison ring and means to reciprocate said unison ring to operate said variable area orifice nozzle through approximately 120° from a position substantially concentric and parallel to the axis of the said tail pipe to a position beyond a plane at right angles to the axis of the tail pipe the said hollow finger portions of the first mentioned segments projecting radially inwards towards the axis of the tail pipe when the variable area orifice nozzle is moved from a position substantially parallel with the axis of the tail pipe to a position approaching a plane at right angles to the axis of the tail pipe and forming a series of gas deflecting and gas straightening surfaces when the said nozzle is moved from a position at right angles to the axis of the tail pipe to a position at an angle forwardly of a plane at right angles to the axis of the tail pipe, the said linkage means holding said brake flaps closed and sealing the said reverse thrust openings when the variable area orifice nozzle is substantially concentric and parallel to the axis of the tail pipe and to pivotally open said brake flaps as the variable area orifice is moved into a position substantially at right angles to the axis of the tail pipe.

14. A combined thrust reversing and noise suppression device as set forth in claim 13, in which the said linkage means includes means for opening said brake flaps independently of each other when the said variable area orifice nozzle is in a position substantially at right angles to the axis of the tail pipe.

15. A combined thrust reversing and noise suppression device for turbo-jet engines comprising a tail pipe nozzle of hollow annular construction, the said tail pipe having a series of air inlets in the wall thereof, reverse thrust openings in said tail pipe forward of said air inlet openings, a variable area orifice nozzle mounted within said tail pipe intermediately between said air inlet and reverse thrust openings, the said variable area orifice nozzle being formed of an annular flexible diaphragm consisting of a multiplicity of segments hinged at the outer periphery of the diaphragm and pairs of segments hinged upon themselves and to the first mentioned segments along the radial edges of said segments to form a V notched configuration on the rearward facing side of said diaphragm, the said first mentioned segments each having a hollow finger portion forming air ducts and together forming a V notched configuration on the forward facing side of said diaphragm, the said hollow finger portions having air inlet openings on the rearward facing side of the diaphragm and air discharge openings located at the peripheral opening of the variable area orifice nozzle with the outer surface of the said fingers forming V notched gas deflecting surfaces on the forward facing side of the said diaphragm, aerodynamically overbalanced brake flaps pivotally mounted in the said reverse thrust openings, a unison ring, guide means supporting said unison ring for longitudinal movement symmetrically parallel with the axis of the tail pipe, linkage means connecting said pairs of segments on said brake flaps with said unison ring, and means to reciprocate the said unison ring in a rearward direction to bring the said variable area orifice nozzle into a position substantially concentric and parallel with the axis of the tail pipe and the air inlet openings of the said hollow fingers substantially opposite the air inlets of the tail pipe and bring the said brake flaps into sealing position in said reverse thrust openings and when reciprocating in a forward direction bringing the said variable area orifice nozzle into a position beyond a plane at right angles to the axis of the tail pipe and pivotally opening the said brake flaps, the fingers of the said variable area orifice nozzle, in the latter position of the unison ring, being directed radially outwards towards the reverse thrust openings of the tail pipe rearwardly of the said brake flaps.

References Cited in the file of this patent

UNITED STATES PATENTS

| | | |
|---|---|---|
| 2,857,119 | Morguloff | Oct. 21, 1958 |
| 2,886,946 | Parker | May 19, 1959 |
| 2,944,395 | Doak | July 12, 1960 |
| 2,945,346 | Arnzen | July 19, 1960 |

FOREIGN PATENTS

| | | |
|---|---|---|
| 997,262 | France | Sept. 12, 1951 |
| 1,092,654 | France | Nov. 10, 1954 |
| 1,155,534 | France | Dec. 2, 1957 |
| 1,179,414 | France | Dec. 22, 1958 |
| 766,986 | Great Britain | Jan. 30, 1957 |

OTHER REFERENCES

Flight Magazine, page 640, Oct. 17, 1958.